US012371357B2

United States Patent
Yatsugi et al.

(10) Patent No.: US 12,371,357 B2
(45) Date of Patent: Jul. 29, 2025

(54) WATER TREATMENT METHOD AND WATER TREATMENT APPARATUS

(71) Applicant: Kubota Corporation, Osaka (JP)

(72) Inventors: Soichiro Yatsugi, Hyogo (JP); Sho Sugiyama, Hyogo (JP); Shinya Nagae, Tokyo (JP); Yoshio Asakura, Hyogo (JP)

(73) Assignee: Kubota Corporation, Osaka (JP)

( * ) Notice: Subject to any disclaimer, the term of this patent is extended or adjusted under 35 U.S.C. 154(b) by 500 days.

(21) Appl. No.: 17/545,686

(22) Filed: Dec. 8, 2021

(65) Prior Publication Data
US 2022/0098075 A1    Mar. 31, 2022

Related U.S. Application Data

(63) Continuation of application No. PCT/JP2020/012967, filed on Mar. 24, 2020.

(30) Foreign Application Priority Data

Jun. 19, 2019  (JP) .................. 2019-113562

(51) Int. Cl.
   *C02F 9/00*      (2023.01)
   *B01D 33/048*    (2006.01)
   (Continued)

(52) U.S. Cl.
   CPC .............. *C02F 9/00* (2013.01); *B01D 33/048* (2013.01); *B01D 33/466* (2013.01); *C02F 3/006* (2013.01);
   (Continued)

(58) Field of Classification Search
   CPC .. C02F 9/00; C02F 3/006; C02F 1/004; C02F 3/1273; C02F 3/20; C02F 3/28;
   (Continued)

(56) References Cited

U.S. PATENT DOCUMENTS

| 2002/0144945 A1* | 10/2002 | Unger ..................... C02F 3/121 |
| | | 210/626 |
| 2016/0083268 A1* | 3/2016 | Erdogan .................. C02F 3/12 |
| | | 210/195.3 |

FOREIGN PATENT DOCUMENTS

| CN | 105548296 A | * 5/2016 |
| JP | 10-043788   |   2/1998 |

(Continued)

OTHER PUBLICATIONS

Espacenet translation of Qiu (CN105548296A) (Year: 2016).*

(Continued)

*Primary Examiner* — Ekandra S. Miller-Cruz
(74) *Attorney, Agent, or Firm* — Beyer Law Group LLP (57) ABSTRACT

A water treatment method treats raw water (water to be treated) containing organic wastewater. The method includes (i) an aeration process performs an initial absorption treatment by aerating the water to be treated, (ii) a filtration process for filtering the water to be treated which has been treated by the initial absorption treatment in the aeration process, (iii) a digestion treatment process for digesting solids captured by the filtration process, (iv) a biological treatment process for denitrifying, with activated sludge, filtered water obtained through the filtration process, (v) a sludge transfer process for sending the activated sludge from the biological treatment process to the aeration process, and (vi) an adjustment process for adjusting an amount of the activated sludge sent to the aeration process via the sludge transfer process based on a nitrogen concentration of treated water which has been biologically treated by the biological treatment process.

11 Claims, 4 Drawing Sheets

(51) Int. Cl.
- *B01D 33/46* (2006.01)
- *C02F 1/00* (2023.01)
- *C02F 3/00* (2023.01)
- *C02F 3/12* (2023.01)
- *C02F 3/20* (2023.01)
- *C02F 3/28* (2023.01)
- *C02F 3/30* (2023.01)
- *C02F 101/16* (2006.01)

(52) U.S. Cl.
CPC ............ *C02F 1/004* (2013.01); *C02F 3/1273* (2013.01); *C02F 3/20* (2013.01); *C02F 3/28* (2013.01); *C02F 3/305* (2013.01); *C02F 2101/16* (2013.01); *C02F 2209/16* (2013.01); *C02F 2301/046* (2013.01)

(58) Field of Classification Search
CPC .. C02F 3/305; C02F 2101/16; C02F 2209/16; C02F 2301/046; C02F 3/1268; C02F 3/30; C02F 11/04; B01D 33/048; B01D 33/466; Y02E 50/30; Y02W 10/10
USPC ....................................................... 210/614
See application file for complete search history.

(56) References Cited

FOREIGN PATENT DOCUMENTS

| | | |
|---|---|---|
| JP | 2003-190997 | 7/2003 |
| JP | 2005-144310 | 6/2005 |
| JP | 2012-106176 | 6/2012 |
| JP | 59-10400 | 8/2016 |
| JP | 2016-172237 | 9/2016 |
| WO | 2015/142586 | 9/2015 |
| WO | 2016/148086 | 9/2016 |

OTHER PUBLICATIONS

Espacenet translation of Suzuki (JP2016172237A) (Year: 2016).*
International Search Report from International Application No. PCT/JP2020/012967 Dated Dec. 24, 2020.

* cited by examiner

WATER TREATMENT METHOD AND WATER TREATMENT APPARATUS

CLAIM OF PRIORITY

This application is a Continuation of International Patent Application No. PCT/JP2020/012967, filed on Mar. 24, 2020, which claims priority to Japanese Patent Application No. 2019-113562, filed on Jun. 19, 2020, each of which is hereby incorporated by reference.

BACKGROUND OF THE INVENTION

1. Field of the Invention

The present invention relates to a water treatment method and water treatment apparatus for treating raw water (water to be treated) containing organic wastewater.

2. Description of the Related Art

Japanese Patent Application Publication No. 59-10400 describes a water treatment method for treating raw water (water to be treated) which contains organic wastewater such as sewage. The method solid-liquid separates the water to be treated, recovers methane gas by performing an anaerobic digestion of the raw sludge which is the sedimentation of the solid-liquid separation, and denitrify the supernatant by performing a biological treatment using an anaerobic-aerobic method or the like. Such a water treatment system saves energy by generating electric power using the methane gas obtained from the anaerobic digestion process, thereby reducing the amount of electricity from the commercial power grid used by the water treatment system.

When the solid-liquid separation is performed in an initial sedimentation basin, fine SS (Suspended Solid) and BOD (Biochemical Oxygen Demand) which do not deposit, as well as soluble BOD, flow out into the supernatant side, rather than taken into the raw sludge, resulting in a decrease in an amount of the gas produced by the anaerobic digestion process.

In order to collect fine SS, BOD, and soluble BOD that do not precipitate in the initial sedimentation basin, it has been considered to utilize an initial adsorption process by the activated sludge. The initial adsorption means physically adsorbing fine particles and soluble BOD in the water to be treated by collecting them onto a surface of the activated sludge having a sticky gelatinous substance secreted mainly by aerobic microorganisms in the activated sludge.

Figure 5:
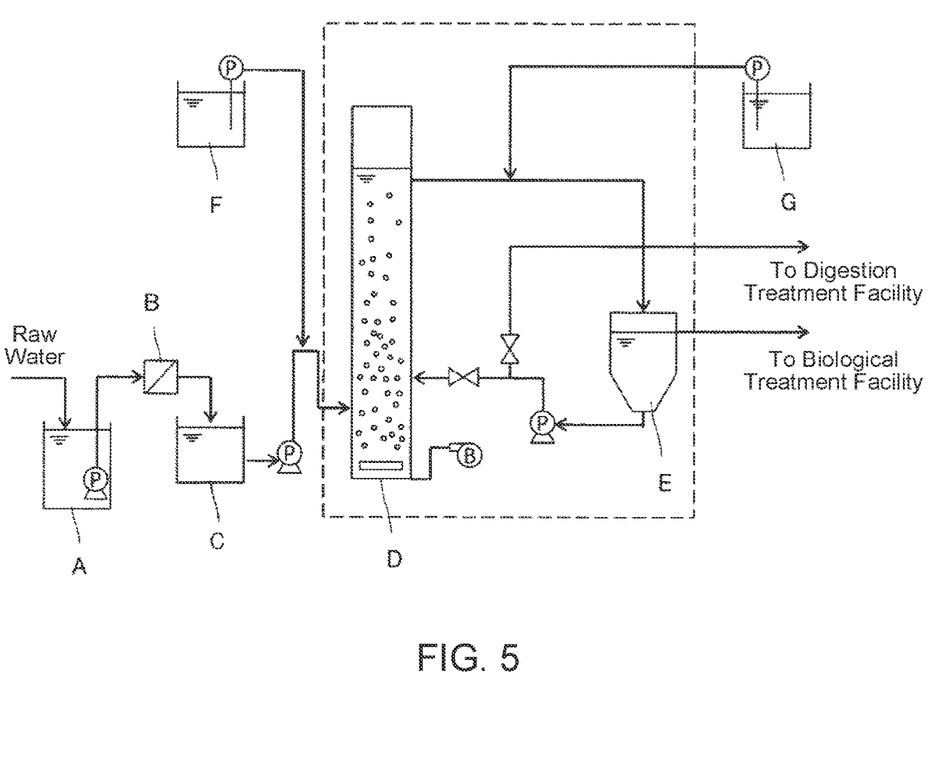
FIG. 5 is a diagram schematically illustrating a conventional water treatment apparatus including an aeration tank and a sedimentation tank, where the initial adsorption treatment is performed in the aeration tank.

For example, as shown in FIG. 5, the water to be treated is flown from an initial sedimentation culvert A, treated by a screen B, stored in a raw water tank C, brought into contact with the activated sludge under an aeration condition in an aeration tank D for an initial adsorption treatment, and then separated into solid and liquid in a sedimentation tank E. The sedimented components are supplied to a digestion treatment facility, while the supernatant is supplied to a biological treatment facility for denitrification. In FIG. 5, the letter F denotes a device for adding organic and inorganic coagulants, and the letter G denotes a device for adding an organic coagulant.

However, the water treatment method discussed above disadvantageously increases a space required for the facility, compared to a simple separation method using an initial sedimentation basin, since installing both of the aeration tank and the sedimentation tank is necessary.

Therefore, in place of the initial sedimentation basin, is has also been considered to employ a rotary filter with a fine filter to filter the raw water, as described in International Application Publication No. WO2015/142586, for example. However, it has been difficult to capture soluble BOD using a rotary filter.

BRIEF DESCRIPTION OF THE INVENTION

In the conventional water treatment method shown in FIG. 5, a residence time in the aeration tank D is about 0.5 hours, and a residence time in the sedimentation tank E is about 1.5 hours, totaling to 2 hours which is relatively long. In such a case, the BOD may be excessively removed from the water to be treated in the initial absorption treatment, such that the biological treatment for the supernatant after the solid-liquid separation may not be adequately performed to provide sufficient denitrification treatment. Such an insufficient denitrification may be detected based on the nitrogen concentration in the biologically treated water, and the operation of the aeration tank D may be switched to reduce the BOD removal rate. However, even if the operation of the aeration tank D is switched as such, it takes long time to obtain the treated water which has sufficiently denitrified.

In light of the above-mentioned problems, the object of the present invention is to provide a water treatment method and a water treatment apparatus capable of appropriately managing a digestion treatment and a denitrification treatment for organic wastewater.

A first characteristic configuration of the water treatment method according to the present invention to achieve the above-mentioned object, is embodied in a method for treating raw water (water to be treated) containing organic wastewater. The method includes (i) an aeration process for performing an initial absorption treatment by aerating the water to be treated, (ii) a filtration process for filtering the water to be treated which has been treated by the initial absorption treatment in the aeration process, (iii) a digestion treatment process for digesting solids captured by the filtration process, (vi) a biological treatment process for denitrifying, with activated sludge, filtered water obtained through the filtration process, (v) a sludge transfer process for sending the activated sludge from the biological treatment process to the aeration process, and (iv) an adjustment process for adjusting an amount of the activated sludge sent to the aeration process via the sludge transfer process based on a nitrogen concentration of treated water which has been biologically treated by the biological treatment process.

Fine SS and BOD, as well as soluble BOD, contained in the water to be treated are initially adsorbed in the aeration process, and the solids captured by the filtration process are sent to the digestion process together with the fine SS and BOD, whereby an efficient digestion treatment is performed. After the filtration process is performed, the filtered water is sent to the biological treatment process, in which the filtered water is denitrified by the activated sludge. The initial absorption performance in the aeration process is maintained by sending the activated sludge which has increased in the biological treatment process to the aeration process via the sludge transfer process. By adjusting an amount of the activated sludge sent to the aeration process via the sludge transfer process based on the nitrogen concentration of the treated water which has been biologically treated in the biological treatment process, an appropriate denitrification in the biological treatment process and an efficient digestion in the digestion process can be realized.

A second characteristic configuration of the water treatment method according to the present invention is that, in addition to the first characteristic configuration described above, the adjustment process reduces the amount of the activated sludge sent to the aeration process if the nitrogen concentration of the treated water is higher than a standard value.

When the nitrogen concentration of the treated water is higher than the standard value, it is determined that the denitrification efficiency has decreased because of an increased rate of the BOD removal in the initial adsorption treatment, and thus a degree of the initial adsorption treatment is adjusted by reducing the amount of the activated sludge sent to the aeration process, thereby quickly improving the denitrification efficiency which has decreased.

A third characteristic configuration of the water treatment method according to the present invention is that, in addition to the first characteristic configuration described above, the adjustment process increases the amount of the activated sludge sent to the aeration process if the nitrogen concentration of the treated water is lower than a standard value.

When the nitrogen concentration of the treated water is lower than the standard value, it is determined that the denitrification efficiency is increasing because the rate of the BOD removal in the initial adsorption treatment is decreasing, and thus the degree of the initial adsorption treatment is adjusted by increasing the amount of the activated sludge sent to the aeration process, thereby quickly returning the denitrification efficiency to the standard value.

A fourth characteristic configuration of the water treatment method according to the present invention is embodied in a water treatment method for treating raw water (water to be treated) containing organic wastewater. The method includes (i) an aeration process for performing an initial adsorption treatment by aerating the water to be treated in a plurality of aeration tanks, (ii) a filtration process for filtering the water to be treated which has been treated by the initial adsorption treatment in the aeration process, (iii) a digestion treatment process for digesting solids captured by the filtration process, (iv) a biological treatment process for denitrifying, with activated sludge, filtered water obtained through the filtration process, (v) a sludge transfer process for sending the activated sludge from the biological treatment process to the aeration process, and (vi) an adjustment process for adjusting a number of the aeration tanks to which the activated sludge is sent via the sludge transfer process, based on a nitrogen concentration of treated water which has been biologically treated in the biological treatment process.

When a plurality of aeration tanks are used in the aeration process for the initial adsorption treatment, an appropriate denitrification treatment in the biological treatment process and an efficient digestion treatment in the digestion process can be achieved by providing the adjustment process for adjusting the number of aeration tanks to which the activated sludge is sent via the sludge transfer process based on the nitrogen concentration of the treated water which has been biologically treated in the biological treatment process.

A fifth characteristic configuration of the water treatment method according to the present invention is that, in addition to the fourth characteristic configuration described above, the adjustment process reduces the number of aeration tanks to which the activated sludge is sent when the nitrogen concentration of the treated water is higher than a standard value.

When the nitrogen concentration of the treated water is higher than the standard value, it is determined that the denitrification efficiency has decreased due to an increased rate of BOD removal in the initial adsorption treatment, and thus the degree of initial adsorption treatment in the aeration process is adjusted by decreasing the number of aeration tanks to which the activated sludge is returned, thereby quickly improving the denitrification efficiency which has decreased.

A sixth characteristic configuration of the water treatment method according to the present invention is that, in addition to the fourth characteristic configuration described above, the adjustment process increases the number of aeration tanks to which the activated sludge is sent, if the nitrogen concentration of the treated water is lower than a standard value.

When the nitrogen concentration of the treated water is lower than the standard value, it is determined that the denitrification efficiency is increasing because the rate of BOD removal in the initial adsorption treatment is decreasing, and thus the degree of the initial absorption treatment is adjusted by increasing an amount of the activated sludge sent to the aeriation process by increasing the number of aeration tanks to which the activated sludge is returned, thereby quickly returning the denitrification efficiency to the standard value.

A seventh characteristic configuration of the water treatment method according to the present invention is embodied by a water treatment method for treating raw water (water to be treated) containing organic wastewater. The method includes (i) an aeration process for performing an initial adsorption treatment by aerating the water to be treated, (ii) a filtration process for filtering the water to be treated, which has been treated by the initial adsorption treatment in the aeration process, with a filter having a circulating filtration surface, (iii) a digestion treatment process for digesting solids captured by the filtration process, (iv) a biological treatment process for denitrifying, with activated sludge, the filtered water obtained through the filtration process, (v) a sludge transfer process for sending the activated sludge from the biological treatment process to the aeration process, and (vi) an adjustment process for adjusting a circulation speed of the filtration surface based on a nitrogen concentration of treated water which has been biologically treated in the biological treatment process.

When the filtration process is performed using a filter having a circulating filtration surface, an appropriate denitrification treatment in the biological treatment process and an efficient digestion treatment in the digestion process can be achieved by providing the adjustment process to adjust the circulation speed of the filtration surface based on the nitrogen concentration of the treated water which has been biologically treated in the biological treatment process. Moreover, such a filter having a circulating filtration surface does not require a large installation area like a sedimentation basin does.

An eighth characteristic configuration of the water treatment method according to the present invention is that, in addition to the seventh characteristic configuration described above, the adjustment process increases the circulation speed of the filtration surface if the nitrogen concentration of the treated water is higher than a standard value.

When the nitrogen concentration of the treated water is higher than the standard value, it is determined that the denitrification efficiency has decreased because of an increased rate of BOD removal in the initial adsorption treatment, and thus the circulation speed of the filtration surface is increased, thereby thinning a layer of solids adhering to and deposited on the filtration surface. This suppresses the capturing of fine SS and BOD and soluble BOD as solids, such that the decreased denitrification efficiency can be quickly improved.

A ninth characteristic configuration of the water treatment method according to the present invention is that, in addition to the seventh characteristic configuration described above, the adjustment process reduces the circulation speed of the filtration surface if the nitrogen concentration of the treated water is lower than the reference value.

When the nitrogen concentration of the treated water is lower than the standard value, it is determined that the denitrification efficiency is increasing because the rate of BOD removal in the initial adsorption treatment is decreasing, and thus the circulation speed of the filtration surface is decreased, thereby thickening the layer of solids adhering to and deposited on the filtration surface. This promotes the capturing of the fine SS and BOD and soluble BOD as solids, such that the denitrification efficiency can be quickly returned to the standard value.

A first characteristic configuration of the water treatment apparatus according to the present invention is embodied in a water treatment apparatus for treating raw water (water to be treated) containing organic wastewater. The water treatment apparatus includes (a) an aeration device configured to perform an initial adsorption treatment by aerating the water to be treated, (b) a filtration device configured to filter the water to be treated which has been treated by the initial absorption treatment in the aeration device, (c) a digestion treatment device configured to digest solids captured by the filtration device, (d) a biological treatment device configured to denitrify, with activated sludge, filtered water obtained though the filtration device, (e) a sludge transfer device configured to send the activated sludge from the biological treatment device to the aeration device, and (f) an adjustment device configured to adjust an amount of the activated sludge sent to the aeration device via the sludge transfer device based on a nitrogen concentration of treated water that has been biologically treated by the biological treatment device.

A second characteristic configuration of the water treatment apparatus according to the present invention is that, in addition to the first characteristic configuration described above, the aeration device includes a plurality of aeration tanks, and the adjustment device is configured to adjust a number of the aeration tanks to which the activated sludge is sent by the sludge transfer device, based on the nitrogen concentration of the treated water which has been biologically treated by the biological treatment device.

As explained above, the present invention makes it possible to provide a water treatment method and a water treatment apparatus which can properly manage the digestion treatment and the denitrification treatment for organic wastewater.

DETAILED DESCRIPTION OF EMBODIMENTS OF THE INVENTION

A water treatment method and a water treatment apparatus according to the present invention will be described below referring to the drawings.

Figure 1A:
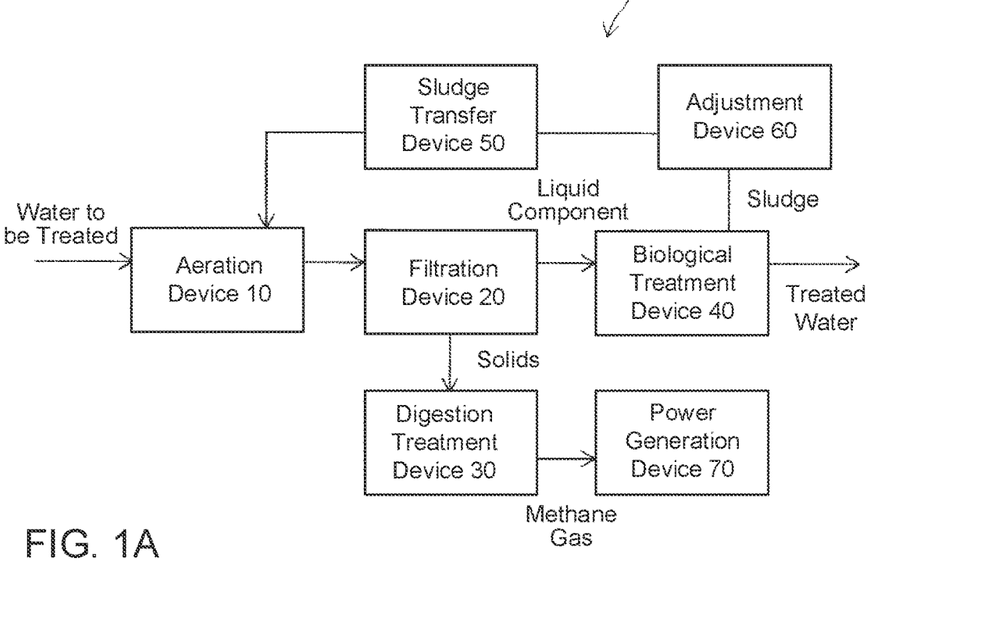
FIG. 1A is a schematic diagram explaining a water treatment apparatus in accordance with the present invention.

FIG. 1A illustrates a water treatment apparatus 100 for treating raw water (water to be treated) containing organic wastewater such as sewage. The water treatment apparatus 100 includes an aeration device 10 configured to perform an initial adsorption treatment by aerating the water to be treated, a filtration device 20 configured to filter the water to be treated which has undergone the initial adsorption treatment by the aeration device 10, and a digestion treatment device 30 configured to digest solids captured by the filtration device 20. In addition, the water treatment apparatus 100 includes a biological treatment device 40 configured to denitrify filtered water obtained through the filtration device 20 using activated sludge, a sludge transfer device 50 configured to transfer the activated sludge from the biological treatment device 40 to the aeration device 10, and an adjustment device 60 configured to adjust an amount of the activated sludge transferred to the aeration device 10 by the sludge transfer device 50, based on a nitrogen concentration of the treated water which has been biologically treated by the biological treatment device 40, among others. The water to be treated, from which large foreign substances have been removed, is stored in a raw water tank, and then supplied to the aeration tank 10.

The aeration device 10 may include a single aeration tank or a plurality of aeration tanks, and diffusers installed at the bottom of each aeration tank. The aeration device 10 is filled with activated sludge transferred from the biological treatment device 40 via the sludge transfer device 50.

The water to be treated flowing into the aeration device 10 is treated by the activated sludge for an initial adsorption treatment, and fine SS and BOD suspended in the water, as well as soluble BOD, are physically adsorbed by sticky gelatinous substance secreted by the aerobic microorganisms in the activated sludge.

The water to be treated which has undergone the initial absorption treatment is separated into solids and liquid by the filtration device 20, and the solids along with the activated sludge are sent to the digestion treatment device 30 for an anaerobic digestion treatment. The methane gas generated in the digestion treatment device 30 is recovered as fuel gas, and used as a heat source for steam or as a combustion gas to operate a power generation device 70 to generate electricity.

The liquid which has solid-liquid separated through the filtration device 20 is sent to the biological treatment device 40, in which the liquid is digested and denitrified by the activated sludge, and the thus-treated purified water is discharged into rivers and the like. The biological treatment device 40 is formed with an anoxic tank 41 (see FIG. 1B) for performing the denitrification treatment, and an aerobic tank 42 (see FIG. 1B) in which membrane separation devices 43 (see FIG. 1B) are immersed. An apparatus employing a membrane bioreactor (MBR) is suitably used as the biological treatment device, since the fine SS and BOD, and soluble BOD are initially adsorbed in the aeration device 10, it is unlikely that membrane clogging occurs in the membrane separation devices 43.

Figure 1B:
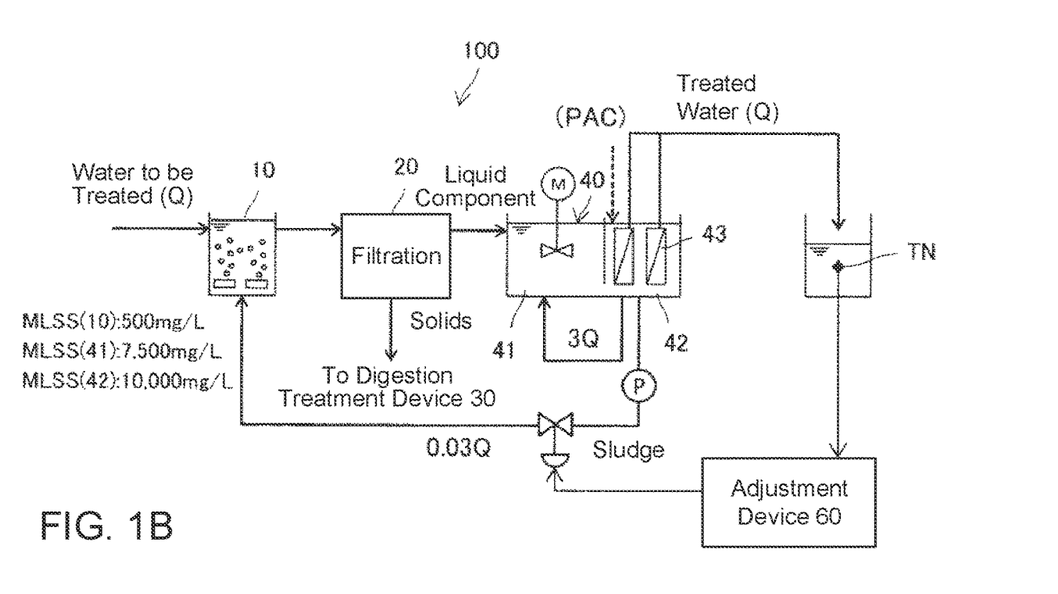
FIG. 1B is a diagram explaining a water treatment method in accordance with the present invention.

Ammoniacal nitrogen contained in the water to be treated is aerobically processed into nitrate-nitrogen in the aerobic tank 42, and then the nitrate-nitrogen is circulated back to the anoxic tank 41 along with the activated sludge for denitrification process therein. The water to be treated in which the BOD has been decomposed by the aerobic process in the aerobic tank 42 is solid-liquid separated via the membrane separation devices 43, and taken out as the treated water.

The biological treatment device 40 is not limited to those which employ a membrane bioreactor (MBR) method, but may also employ other method capable of performing a denitrification processes, such as a circulating nitrification-denitrification method.

A portion of excess sludge produced in the biological treatment device 40 is supplied to the aeration device 10 via the sludge transfer device 50 such as a pump or the like, and the initial adsorption treatment for the water to be treated is performed in the aeration device 10.

Figure 2:
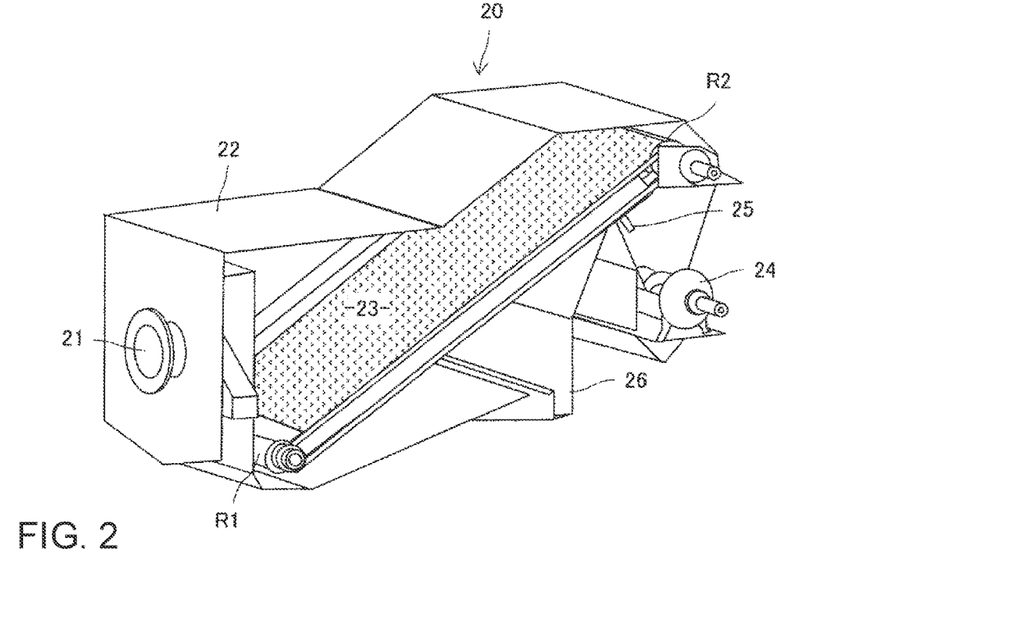
FIG. 2 is a diagram illustrating a rotary filter employed as a filtration device in accordance with one embodiment of the present invention.

FIG. 2 shows a basic configuration of a rotary filter device 20, which is suitably used as the filtration device 20. The rotary filter device 20 has a casing 22 having an inlet 21 for the water to be treated provided on an end surface, a filter 23 housed inside the casing 22, a screw conveyor 24 which receives and conveys solids captured by the filter 23, and a drainage channel 26 for discharging liquid obtained through the filter 23.

The filter 23 includes an endless belt crossed between at least two rollers R1 and R2 to have an inclined posture providing an upward slope from the side of the inlet 21 for the water to be treated. The surface of the belt serves as a filtration surface having a mesh width (spacing) of about 300-500 μm. The mesh width of the filtration surface is not limited to this value, but can be set appropriately according to the characteristics of the substant to be filtered.

The solids contained in the water to be treated are captured on the filtration surface when the above-described circulating endless belt travels upward from the lower roller R1 to the upper roller R2, and when the belt travels back from the upper roller R2 to the lower roller R1, the captured solids are removed from the filtration surface by a scraper 25 and fall into the screw conveyor 24, which carries away the solids to the backside of the casing 22. The liquid content of the water to be treated entering from the inlet 21 is discharged through the drainage channel 26 after passing through the filter 23.

The filtration device 20 is not limited to the rotary filter device described above, but other devices such as a drum screen device and a high-speed filtration device can be used. No matter which filtration device 20 is employed, it can be configured as a compact device with a smaller installation area than when using a conventional sedimentation basin.

If the removal rate of the BOD contained in the water to be treated increases more than the target value due to the initial adsorption treatment performed in the aeration device 10, the BOD concentration required for the denitrification treatment in the anoxic tank 41 of the biological treatment device 40 may decrease, making it difficult to perform a sufficient denitrification treatment.

Therefore, the water treatment apparatus 100 may include a nitrogen concentration meter TN (see FIG. 1B) for measuring the nitrogen concentration of the treated water which has been biologically treated in the biological treatment device 40, and an adjustment device 60 for adjusting a degree of the initial adsorption treatment in the aeration device 10 based on the measured value of the nitrogen concentration.

In the following, the water treatment method of the present invention will be described in detail focusing on the adjustment device 60 provided in the water treatment apparatus 100 described above.

First Embodiment of the Water Treatment Method

As shown in FIG. 1B, the water treatment method treats raw water (water to be treated) containing organic wastewater. The method includes an aeration process for performing an initial adsorption treatment by aerating the water to be treated, a filtration process for filtering the water to be treated, after the initial absorption treatment by the aeration process, a digestion treatment process for digesting solids captured by the filtration process, a biological treatment process for denitrifying, with activated sludge, filtered water obtained though the filtration process, a sludge transfer process for sending the activated sludge from the biological treatment process to the aeration process, and an adjustment process for adjusting an amount of the activated sludge sent to the aeration process via the sludge transfer process, based on a nitrogen concentration of treated water which has been biologically treated by the biological treatment process.

The aeration process is performed by the aeration device 10 described above, the filtration process is performed by the filtration device 20, the digestion treatment process is performed by the digestion treatment device 30, the biological treatment process is performed by the biological treatment device 40, the sludge transfer process is performed by the sludge transfer device 50, and the adjustment process is performed by the adjustment device 60.

In the aeration process, fine SS and BOD, and soluble BOD contained in the water to be treated are initially adsorbed, and the solids captured in the filtration process are sent to the digestion treatment process together with the fine SS and BOD, whereby an efficient digestion treatment is performed. After the filtration process, the filtered water is sent to the biological treatment process, where it is denitrified by the activated sludge. The activated sludge increased in the biological treatment process is sent to the aeration process by the sludge transfer process, thereby maintaining the performance of the initial adsorption treatment the aeration process.

In the aeration process, a hydraulic residence time HRT is set to 0.5 hours, and the dissolved oxygen concentration DO is adjusted to about 1 mg/L. In an activated sludge treatment method, the hydraulic residence time HRT is set to 6.0 hours such that the BOD is sufficiently taken in and decomposed, while in the aeration process, the HRT is set to a very short time compared with the activated sludge treatment method, since the purpose thereof is an initial adsorption treatment. In addition, by keeping the dissolved oxygen concentration low, the oxygen concentration in the solids content subject to the digestion treatment is kept low.

In the adjustment process, the amount of the activated sludge sent via the sludge transfer process to the aeration process is adjusted based on the nitrogen concentration of the treated water which has been biologically treated in the biological treatment process, thereby realizing an appropriate denitrification treatment in the biological treatment process and an efficient digestion treatment in the digestion process. For example, the adjustment device 60 can be realized as a control device which controls a degree of opening of a valve mechanism provided in a sludge transfer pipe forming the sludge transfer device 60, and/or a rotation speed of a pump which supplies the activated sludge to the sludge transfer pipe, thereby adjusting an amount of the activated sludge flowing through the sludge transfer pipe. In FIG. 1B, the symbol TN denotes a nitrogen concentration meter.

In the adjustment process, if the nitrogen concentration of the treated water is higher than a standard value, the amount of the activated sludge sent to the aeration process is reduced, and if the nitrogen concentration of the treated water is lower than the standard value, the amount of the activated sludge sent to the aeration process is increased.

When the nitrogen concentration of the treated water is higher than the standard value, it is determined that the denitrification efficiency has decreased due to an increased rate of BOD removal in the initial adsorption treatment, and thus an amount of the activated sludge sent to the aeration process is reduced, thereby adjusting the degree of the initial adsorption treatment such that the decreased denitrification efficiency can be quickly improved.

When the nitrogen concentration of the treated water is lower than the standard value, it is determined that the denitrification efficiency has increased because the rate of BOD removal in the initial adsorption treatment has decreased, and thus an amount of the activated sludge sent to the aeration process is increased, thereby adjusting the degree of the initial adsorption treatment such that the denitrification efficiency can be quickly restored to the standard value.

In this example, target values for MLSS (Mixed Liquor Suspended Solids) are set at 500 mg/L in the aeration tank 10, 7,500 mg/L in the anoxic tank 41, and 10,500 mg/L in the aerobic tank 42, respectively, and with respect to an inflow amount (flowrate) Q of the water to be treated, an outflow amount (flowrate) of the treated water is adjusted to Q, an amount of the sludge circulating from the aerobic tank 42 to the anoxic tank 41 is adjusted to 3Q, and an amount of the sludge sent from the biological treatment device 40 to the aeration device 10 is adjusted to 0.03Q.

The Second Embodiment of the Water Treatment Method

Figure 3:
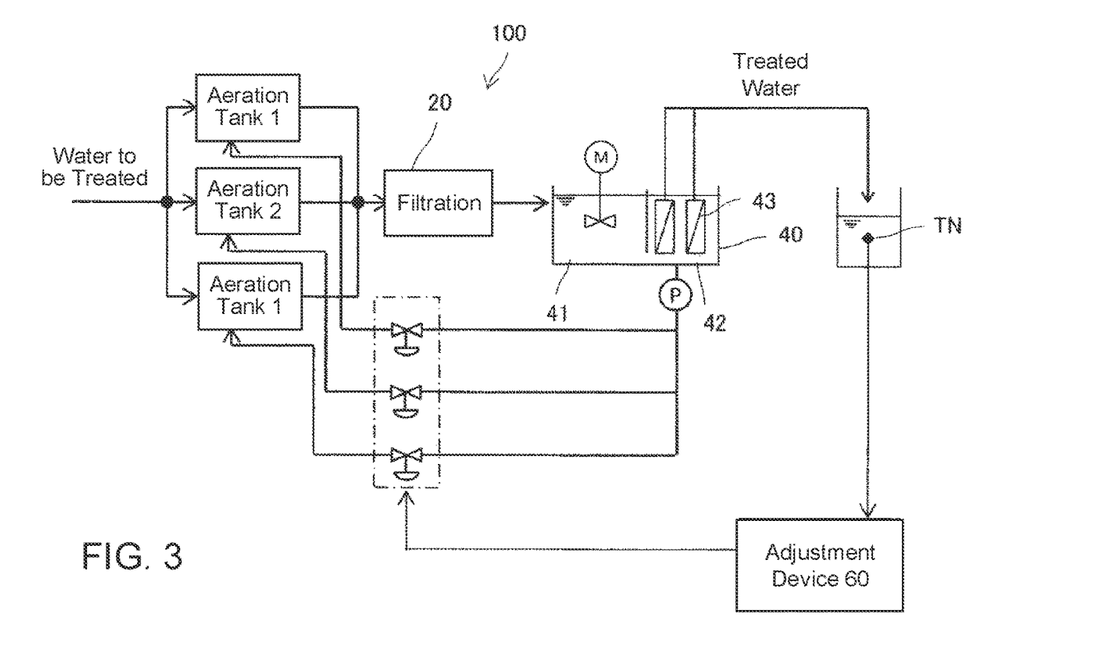
FIG. 3 is a diagram schematically illustrating a water treatment method in accordance with one embodiment of the present invention.

The second embodiment is described below. As shown in FIG. 3, in this embodiment, the aeration device 10 includes a plurality of aeration tanks (three tanks in this embodiment), and an adjustment process is provided to adjust the number of aeration tanks to which the activated sludge is sent by the sludge transfer process, based on the nitrogen concentration of the treated water which has been biologically treated in the biological treatment process.

In this way, when a plurality of aeration tanks are used for the aeration process to perform the initial adsorption treatment, by providing an adjustment process for adjusting the number of aeration tanks to which the activated sludge is sent via the sludge transfer process based on the nitrogen concentration of the treated water which has been biologically treated in the biological treatment process, an appropriate denitrification treatment in the biological treatment process and an efficient digestion treatment in the digestion treatment process can be achieved.

In this case, the adjustment device 60 may be realized by a controller or the like for controlling opening/closing of a valve mechanism provided in each of the sludge transfer pipes connected to the respective aeration tanks to adjust an amount of sludge flowing in the sludge transfer pipes.

In the adjustment process, when the nitrogen concentration of the treated water is higher than a standard value, the number of aeration tanks to which the activated sludge is sent is decreased, while the nitrogen concentration of the treated water is lower than the standard value, the number of aeration tanks to which the activated sludge is sent is increased.

When the nitrogen concentration of the treated water is higher than the standard value, it is determined that the denitrification efficiency has decreased because the rate of BOD removal in the initial adsorption treatment has increased, and thus the degree of the initial adsorption treatment in the aeration process is adjusted by decreasing the number of aeration tanks to which the activated sludge is sent, such that the decreased denitrification efficiency can be improved quickly.

When the nitrogen concentration of the treated water is lower than the standard value, it is determined that the denitrification efficiency has increased because the rate of BOD removal in the initial adsorption treatment has decreased, and thus the degree of the initial adsorption treatment is adjusted by increasing the number of aeration tanks to which the activated sludge is returned, thereby increasing an amount of the activated sludge sent to the aeration process, such that the denitrification efficiency can be quickly restored to the standard value.

Stopping the sludge transfer process for a short period of time suppresses an amount of the initial adsorption without imposing a risk of decomposition of the sludge filled in the aeration tank. In addition, simultaneously decreasing an amount of air diffused from the diffuser in the aeration tank also suppresses the amount of the initial adsorption. The amount of air diffused from the diffuser in the aeration tank can also be decreased or suppressed without stopping the sludge transfer process. The amount of the initial adsorption can be suppressed by suppressing the amount of the air diffusion.

Furthermore, the amount of water to be treated delivered from the raw water tank to each aeration tank may be adjusted. For example, if the nitrogen concentration of the treated water is lower than a standard value, the amount of water to be treated supplied to the aeration tanks having a suppressed amount of aeration may be increased, while the amount supplied to the other aeration tanks having a normal or standard amount of aeration may be suppressed, keeping the total supply amount of water to be treated constant.

When the time period during which the sludge transfer process is stopped becomes longer, it is necessary to provide an agitation mechanism for agitating the sludge in the aeration tanks in order to avoid sedimentation and decomposition of the sludge. If the aeration tanks are not provided with such an agitation mechanism, the water to be treated can be discharged, together with the sludge, from the aeration tanks to which the sludge is not transferred, or in which the aeration is stopped, through a drain pipe and returned to the raw water tank which stores the water to be treated.

The Third Embodiment of the Water Treatment Method

Next, a third embodiment is described. In this embodiment, the filtration device 20 is provided with the rotary filter device described above, and the filtration process is configured such that the water to be treated which has undergone the initial absorption treatment in the aeration process is filtered by a filter having a circulating filtration surface.

The adjustment process is configured to adjust a circulation speed of the filtration surface based on the nitrogen concentration of the treated water which has been biologically treated in the biological treatment process.

That is, when the filtration process is performed using a filter having a circulating filtration surface, by providing an adjustment process for adjusting the circulation speed of the filtration surface based on a nitrogen concentration of the treated water which has been biologically treated in the biological treatment process, an appropriate denitrification treatment in the biological treatment process and an efficient digestion treatment in the digestion process can be achieved. In addition, a filter having a circulating filtration surface does not require a large installation area like a sedimentation basin.

When the nitrogen concentration of the treated water is higher than a standard value, the circulation speed of the filtration surface is increased, and when the nitrogen concentration of the treated water is lower than the standard value, the circulation speed of the filtration surface is decreased.

When the nitrogen concentration of the treated water is higher than the standard value, it is determined that the denitrification efficiency has decreased due to an increased rate of BOD removal in the initial adsorption treatment, and thus the circulation speed of the filtration surface is increased to thin a layer of solids adhering to and deposited on the filtration surface, thereby suppressing capturing of fine SS and BOD and soluble BOD as solids, such that the decreased denitrification efficiency can be improved quickly.

When the nitrogen concentration of the treated water is lower than the standard value, it is determined that the denitrification efficiency has increased because of a decreased rate of BOD removal in the initial adsorption treatment, and thus the circulation speed of the filtration surface is reduced to thicken the layer of solids adhering to and deposited on the filtration surface, thereby promoting the capturing of the fine SS and BOD and soluble BOD as solids, such that the denitrification efficiency can be quickly restored to the standard value.

The Fourth Embodiment of the Water Treatment Method

Figure 4A:
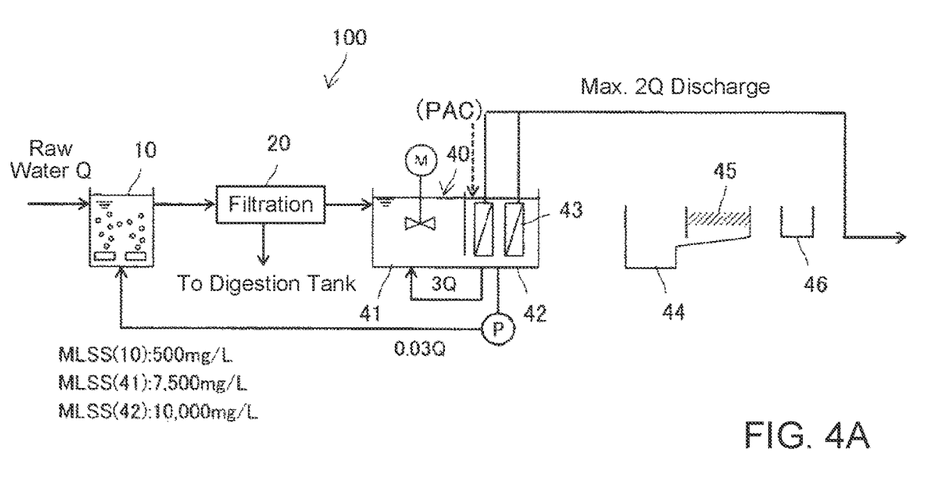
FIG. 4A is a diagram schematically illustrating an organic wastewater treatment apparatus, explaining a water treatment method performed under sunny weather in accordance with one embodiment of the present invention.
Figure 4B:
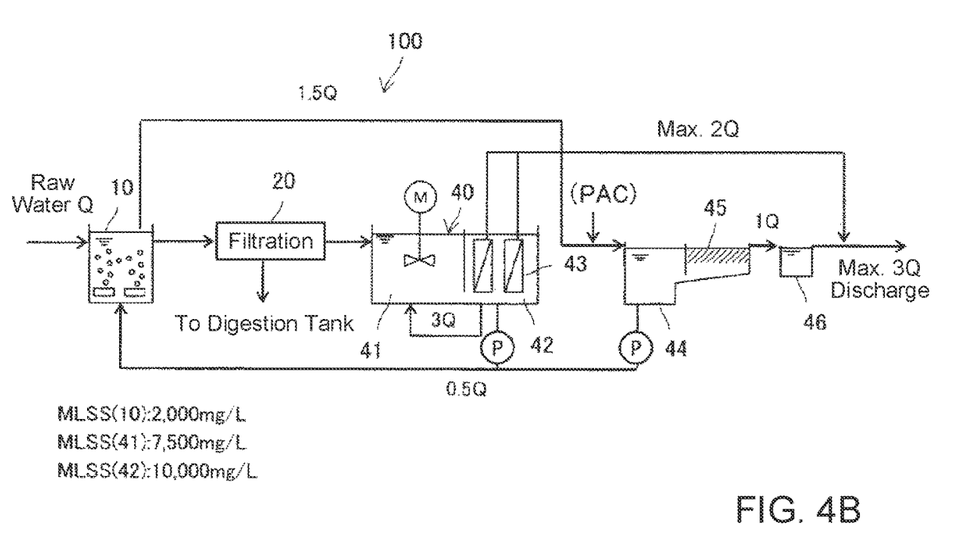
FIG. 4B is a diagram schematically illustrating on of an organic wastewater treatment apparatus, explaining a water treatment method performed under rainy weather, in accordance with one embodiment of the present invention

FIGS. 4A and 4B show an example in which the water to be treated is sewage from a combined sewerage system. FIG. 4A illustrates the water treatment method performed in sunny weather, while FIG. 4B illustrates the water treatment method performed in rainy weather. In sunny weather, the water to be treated is treated by the water treatment method in accordance with the first embodiment described above, and up to the maximum amount 2Q of the treated water is discharged.

In rainy weather, when the inflow of the water to be treated increases, in order to handle the peak flow rate of the water to be treated, the concentration of sludge in the aeration device 10 is increased, and a portion of the sludge which has been treated by the initial absorption treatment is led to the sedimentation tank 44 for solid-liquid separation, and then the water to be treated is disinfected in a disinfection tank 46 and discharged into rivers, etc., together with the treated water filtered by the membrane separation devices 43. In this case, the excess sludge in the aerobic tank 42 can be transferred to the aeration device 10 along with the sludge settled in the sedimentation tank 44. The reference numeral 45 shown in FIG. 4B denotes an inclined plate for improving the sedimentation efficiency.

It should be noted that the above-mentioned embodiments are respective aspects of the present invention, that the present invention is not limited by this description, and that the specific configuration and design of each part can be altered as appropriate to achieve the effect of the invention.

What is claimed is:

1. A water treatment method for treating raw water (water to be treated) containing organic wastewater, comprising:
   an aeration process including performing an initial absorption treatment by aerating the water to be treated;
   a filtration process including filtering the water to be treated which has been treated by the initial absorption treatment in the aeration process;
   a digestion treatment process including digesting solids captured by the filtration process;
   a biological treatment process including denitrifying, with activated sludge, filtered water obtained through the filtration process;
   a sludge transfer process including sending the activated sludge from the biological treatment process to the aeration process; and
   an adjustment process including adjusting an amount of the activated sludge sent to the aeration process via the sludge transfer process based on a nitrogen concentration of treated water which has been biologically treated by the biological treatment process and has been filtered by a membrane separation device.

2. The water treatment method according to claim 1, wherein the adjustment process reduces the amount of the activated sludge sent to the aeration process when a measured value of the nitrogen concentration of the treated water is higher than a predetermined standard value.

3. The water treatment method according to claim 1, wherein the adjustment process increases the amount of the activated sludge sent to the aeration process when a measured value of the nitrogen concentration of the treated water is lower than a predetermined standard value.

4. A water treatment method for treating raw water (water to be treated) containing organic wastewater, comprising:
   an aeration process including performing an initial adsorption treatment, by aerating the water to be treated in a plurality of aeration tanks;
   a filtration process including filtering the water to be treated which has been treated by the initial absorption treatment in the aeration process;
   a digestion treatment process including digesting solids captured by the filtration process;
   a biological treatment process including denitrifying, with activated sludge, filtered water obtained through the filtration process;
   a sludge transfer process including sending the activated sludge from the biological treatment process to the aeration process; and
   an adjustment process including adjusting a number of the aeration tanks to which the activated sludge is sent via the sludge transfer process, based on a nitrogen concentration of treated water which has been biologically treated in the biological treatment process and has been filtered by a membrane separation device.

5. The water treatment method according to claim 4, wherein the adjustment process reduces the number of aeration tanks to which the activated sludge is sent, when the nitrogen concentration of the treated water is higher than a predetermined standard value.

6. The water treatment method according to claim 4, wherein the adjustment process increases the number of aeration tanks to which the activated sludge is sent, when the nitrogen concentration of the treated water is lower than a predetermined standard value.

7. A water treatment method for treating raw water (water to be treated) containing organic wastewater, comprising:
- an aeration process including performing an initial adsorption treatment by aerating the water to be treated;
- a filtration process including filtering the water to be treated, which has been treated by the initial adsorption treatment in the aeration process, with a rotary filter having a rotating filtration surface;
- a digestion treatment process including digesting solids captured by the filtration process;
- a biological treatment process including denitrifying, with activated sludge, filtered water obtained through the filtration process;
- a sludge transfer process including sending the activated sludge from the biological treatment process to the aeration process; and
- an adjustment process including adjusting a rotation speed of the filtration surface based on a nitrogen concentration of treated water which has been biologically treated in the biological treatment process.

8. The water treatment method according to claim 7, wherein the adjustment process increases the rotation speed of the filtration surface when the nitrogen concentration of the treated water is higher than a predetermined standard value.

9. The water treatment method according claim 7, wherein the adjustment process reduces the rotation speed of the filtration surface when the nitrogen concentration of the treated water is lower than a predetermined standard value.

10. A water treatment apparatus for treating raw water (water to be treated) containing organic wastewater, comprising: an aeration device configured to perform an initial adsorption treatment by aerating the water to be treated; a filtration device configured to filter the water to be treated which has been treated by the initial absorption treatment in the aeration device; a digestion treatment device configured to digest solids captured by the filtration device; a biological treatment device configured to denitrify, with activated sludge, filtered water obtained though the filtration device; a sludge transfer device configured to send the activated sludge from the biological treatment device to the aeration device; and an adjustment device configured to adjust an amount of the activated sludge sent to the aeration device via the sludge transfer device, based on a nitrogen concentration of treated water that has been biologically treated by the biological treatment device and has been filtered by a membrane separation device.

11. The water treatment apparatus according claim 10,
wherein the aeration device includes a plurality of aeration tanks, and
wherein the adjustment device is configured to adjust a number of the aeration tanks to which the activated sludge is sent via the sludge transfer device, based on the nitrogen concentration of the treated water which has been biologically treated by the biological treatment device.

* * * * *